United States Patent
Moon et al.

(10) Patent No.: US 8,200,030 B2
(45) Date of Patent: Jun. 12, 2012

(54) METHOD AND APPARATUS FOR CONVERTING BIT-PLANE IMAGE, AND METHOD AND APPARATUS FOR INVERSE-CONVERTING BIT-PLANE IMAGE

(75) Inventors: Young-ho Moon, Suwon-si (KR);
Sung-bum Park, Seongnam-si (KR);
Woo-sung Shim, Suwon-si (KR);
Dai-Woong Choi, Seoul (KR);
Jong-bum Choi, Suwon-si (KR);
Jae-won Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/420,409

(22) Filed: Apr. 8, 2009

(65) Prior Publication Data
US 2009/0279803 A1   Nov. 12, 2009

(30) Foreign Application Priority Data

May 6, 2008   (KR) .................. 10-2008-0041995

(51) Int. Cl.
*G06K 9/36* (2006.01)
(52) U.S. Cl. ........ 382/232; 382/244; 382/233; 382/238; 382/250; 375/240.25; 375/240.24; 375/E07.2; 375/E07.226; 375/240.09
(58) Field of Classification Search .................. 382/232, 382/233, 238, 244, 100; 375/240.2, 240.24, 375/E07.2, E07.22
See application file for complete search history.

(56) References Cited

U.S. PATENT DOCUMENTS

| 5,446,831 A * | 8/1995 | Yamashita et al. ............. 358/1.2 |
| 5,461,680 A * | 10/1995 | Davis ............................. 382/276 |
| 5,940,129 A * | 8/1999 | Burns ......................... 375/240.25 |
| 6,181,747 B1 * | 1/2001 | Burns ....................... 375/240.09 |
| 8,094,951 B2 * | 1/2012 | Chen ............................. 382/232 |
| 2004/0006582 A1 * | 1/2004 | Hagihara ..................... 708/400 |
| 2010/0002943 A1 * | 1/2010 | Moon et al. .................. 382/233 |

* cited by examiner

*Primary Examiner* — Brian Q Le
*Assistant Examiner* — Mekonen Bekele
(74) *Attorney, Agent, or Firm* — Sughrue Mion, PLLC

(57) ABSTRACT

Provided are methods and apparatuses for converting a lower bit-plane image, and methods and apparatuses for inverse-converting the lower bit-plane image, which increase the correlation of the lower bit-plane image. According to the method of converting a lower bit-plane image, pixels of the lower bit-plane image are sequentially added or subtracted so as to generate a converted lower bit-plane image. Accordingly, the lower bit-plane image has higher regularity, and thus the efficiency of image processing using the lower bit-plane image is improved.

19 Claims, 12 Drawing Sheets

METHOD AND APPARATUS FOR CONVERTING BIT-PLANE IMAGE, AND METHOD AND APPARATUS FOR INVERSE-CONVERTING BIT-PLANE IMAGE

CROSS-REFERENCE TO RELATED PATENT APPLICATION

This application claims the priority from Korean Patent Application No. 10-2008-0041995, filed on May 6, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to processing an image by using a bit-plane, and more particularly, to converting a lower bit-plane image, and to inverse-converting the lower bit-plane image, which can increase correlation of the lower bit-plane image.

2. Description of the Related Art

Processing an image by using a bit-plane image is performed by dividing a multi-level image into a group of several binary images, and then processing each divided binary image. A pixel value p of a pixel in m bits may be expressed according to an equation, $p=a_{m-1}*2^{m-1}+a_{m-2}*2^{m-2}+\ldots+a_1*2^1+a_0*2^0$, which is in a form of a polynomial having a base of 2. When each pixel value p is expressed in a bit string including m bits as in the above equation, a method of dividing an input image into bit-plane images can be performed by dividing an input image into bit-plane images, which are planes formed of the n-th bit with regards to a bit string of a pixel value of each pixel of the input image, wherein $1 \leq n \leq m$ and n is an integer. When a pixel value is expressed in a bit string having m bits, the first bit of the bit string is a most significant bit (MSB), and the last m-th bit of the bit string is a least significant bit (LSB). Accordingly, when an image is divided into bit-plane images, m bit-plane images each including a single bit from MSB to the LSB of the bit string of each pixel in the image are formed.

FIG. 1 is a diagram illustrating an input image 10 divided into bit-plane images according to a related technology. Here, reference numerals 11 through 18 denote a zeroth bit-plane image, a first bit-plane image, a second bit-plane image, a third bit-plane image, a fourth bit-plane image, a fifth bit-plane image, a sixth bit-plane image, and a seventh bit-plane image, respectively.

Referring to FIG. 1, when each pixel value of the input image 10 is expressed by using eight bits, the zeroth bit-plane image 11 includes an $a_0$ bit, which is the LSB of each pixel of the input image 10, and a (m−1)-th bit-plane image includes an $a_{m-1}$ bit, which is the m-th bit of each pixel of the input image 10. Referring to lower bit-plane images, i.e., the zeroth through third bit-plane images 11 through 14, from among the bit-plane images illustrated in FIG. 1, it can be seen that a correlation or similarity between the zeroth through third bit-plane images 11 through 14 is remarkably low. This is because even when adjacent pixels have a correlation or similarity in the input image 10, pixel values change when only low bits are separated from the original pixel values, thereby decreasing the correlation. For example, if it is assumed that pixel values of adjacent pixels in the input image 10 are 127, 127, 128, 128, 128, 128, and 128, then it is clear that they are very similar. Here, a pixel value 127 expressed in a binary is 01111111, and a pixel value 128 expressed in a binary is 10000000. When the pixel value is 127 in the input image 10, a pixel value of a pixel corresponding to the third bit-plane image 14 has a value of 15 corresponding 1111 that is the four low bit strings, and when the pixel value is 128 in the input image 10, a pixel value of a pixel corresponding to the third bit-plane image 14 has a value of 0 corresponding to 0000 that is the four low bit strings. Accordingly, the correlation of the pixels in the input image 10 may be poor in a lower bit-plane image when bit-plane dividing is performed. As illustrated in FIG. 1, it is generally difficult to find any regularity in the lower bit-plane images, and the correlation between pixels in each lower bit-plane image is low. Consequently, the lower bit-plane images having low correlation are not suitable to be processed, for example, not suitable for image compression, because the lower bit-plane images lack regularity.

SUMMARY OF THE INVENTION

The present invention provides a method and apparatus for converting a bit-plane image, and a method and apparatus for inverse-converting the bit-plane image, which increases correlation of lower bit-plane images by converting pixel values of pixels in lower bit-plane images from among bit-plane images.

The present invention also provides a method and apparatus for encoding an image, and a method and apparatus for decoding the image, which perform lossless compression by using a converted lower bit-plane image.

According to an aspect of the present invention, there is provided a method of converting a bit-plane image, the method including: separating an input image into n bit-plane images, wherein n is a positive integer; generating conversion processing units by binding "a" pixels, which are included in at least one lower bit-plane image having bits below a predetermined number from among the n bit-plane images and are adjacent in one of a row direction and a column direction, wherein "a" is an integer greater than or equal to 2; and converting pixel values of each pixel in the conversion processing unit by accumulating each pixel value from an initial pixel to a b-th pixel from among the "a" pixels in the conversion processing unit in a first direction selected from among a positive direction and a negative direction, and accumulating each pixel value from a (b+1)-th pixel to the last pixel in a second direction that is opposite to the first direction, in each conversion processing unit, wherein "b" is an integer smaller than "a".

According to another aspect of the present invention, there is provided an apparatus for converting a bit-plane image, the apparatus including: a bit-plane image separator, which separates an input image into n bit-plane images, wherein n is a positive integer; a conversion processing unit generator which generates conversion processing units by binding "a" pixels, which are included in at least one lower bit-plane image having bits less than a predetermined number from among the n bit-plane images and are adjacent in one of a row direction and a column direction, wherein "a" is an integer greater than or equal to 2; and a conversion processor which converts pixel values of each pixel in each conversion processing unit by accumulating each pixel value from the initial pixel to a b-th pixel from among the "a" pixels in each conversion processing unit in a first direction selected from among a positive direction and a negative direction, and accumulating each pixel value from a (b+1)-th pixel to a last pixel in a second direction that is opposite to the first direction, according to each conversion processing unit, wherein "b" is an integer smaller than "a".

According to another aspect of the present invention, there is provided a method of inverse-converting a bit-plane image, the method including: receiving information about converted pixels that are included in inverse-conversion processing units each generated by binding converted "a" pixels, wherein "a" is an integer greater than or equal to 2, the converted "a" pixels are included in a lower bit-plane image having bits less than a predetermined number and adjacent in one of a column direction and a row direction, the converted pixels converted by accumulating pixel values from the initial pixel to a b-th pixel from among the converted "a" pixels in an inverse-conversion processing unit in a first direction selected from among a positive direction and a negative direction, and accumulating pixel values from a (b+1)-th pixel to the last pixel in the inverse-conversion processing unit in a second direction that is opposite to the first direction, wherein "b" is an integer smaller than "a"; and restoring pixel values of pixels each corresponding to the inverse-conversion processing unit by calculating a difference between an adjacent converted pixel value, for each of the converted "a" pixels in the inverse-conversion processing unit.

According to another aspect of the present invention, there is provided an apparatus for inverse-converting a bit-plane image, the apparatus including: a converted pixel information extractor which extracts information about converted pixels that are included in inverse-conversion processing units each generated by binding converted "a" pixels, wherein "a" is an integer of greater than or equal to 2, the converted a pixels included in a lower bit-plane image having bits below a predetermined number and adjacent in one of a column direction and a row direction, the converted pixels converted by accumulating pixel values from the initial pixel to a b-th pixel from among the converted "a" pixels in an inverse-conversion processing unit in a first direction selected from among a positive direction and a negative direction, and accumulating pixel values from a (b+1)-th pixel to the last pixel in the inverse-conversion processing unit in a second direction that is opposite to the first direction, wherein "b" is an integer smaller than "a"; and an inverse-conversion processor which restores pixel values of pixels each corresponding to the inverse-conversion processing unit by calculating a difference between an adjacent converted pixel value, for each of the converted a pixels in the inverse-conversion processing unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 1:
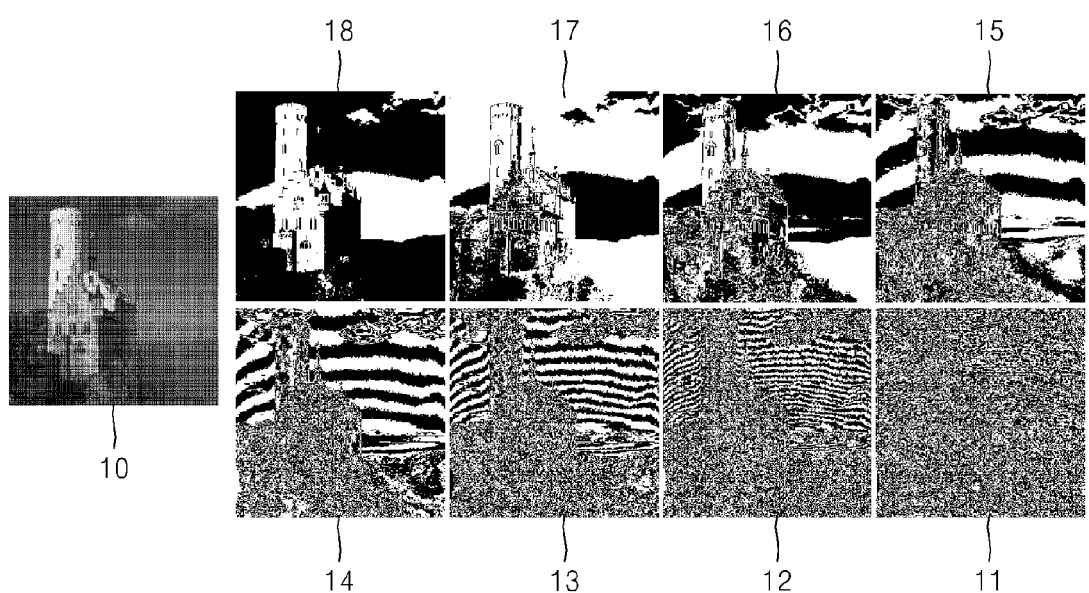
FIG. 1 is a diagram illustrating an input image divided into bit-plane images, according to a related technology.
Figure 2:
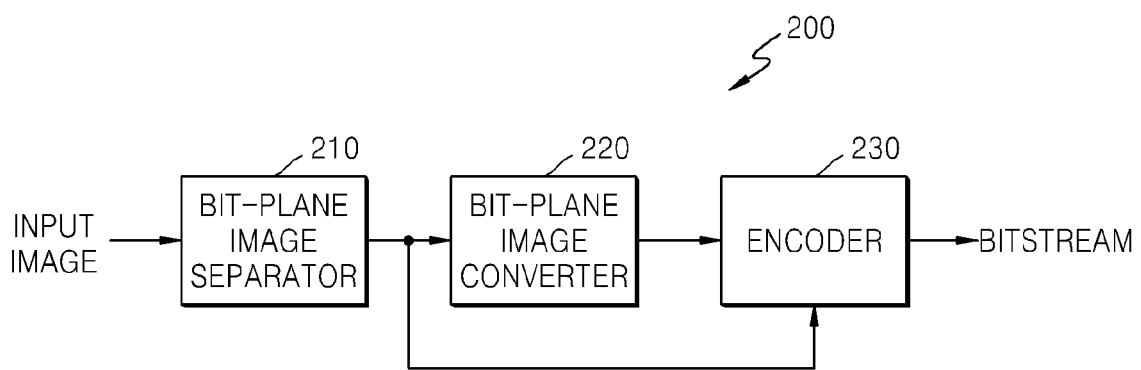
FIG. 2 is a block diagram illustrating an apparatus for encoding an image, according to an exemplary embodiment of the present invention.

FIG. 2 is a block diagram illustrating an apparatus 200 for encoding an image, according to an exemplary embodiment of the present invention. The apparatus 200 includes a bit-plane image separator 210, a bit-plane image converter 220, and an encoder 230.

The bit-plane image separator 210 divides an input image into n bit-plane images, wherein n is a positive integer. Assuming that a pixel value of each pixel of the input image is in the form of a bit string including n bits, the bit-plane image separator 210 divides the input image into n bit-plane images, each of which is a plane formed of an x-th bit from among a bit string corresponding to each pixel value of the input image, wherein $1 \leq x \leq n$ and x is a positive integer. As described above, when each pixel value of the input image is expressed as a bit string of length n, the input image may be divided into n bit-plane images, each including a single bit from the most significant bit (MSB) to the least significant bit (LSB) of the bit string of each pixel. In other words, the input image may be divided into n bit-plane images, from a 0th bit-plane image formed using the LSBs, i.e., the first bit of each pixel, to an (n−1)-th bit plane image formed using the MSBs, i.e., n-th bit of each pixel. The method according to the current exemplary embodiment may be used to convert a lower bit-plane image that is separated via various methods well known to one of ordinary skill in the art, and the way of dividing the input image is not limited to above.

The bit-plane image converter 220 generates a converted bit-plane image by converting pixels in a lower bit-plane image having bits below a predetermined number from among the n bit-plane images into a conversion processing unit formed of a predetermined number of pixels.

Figure 3:
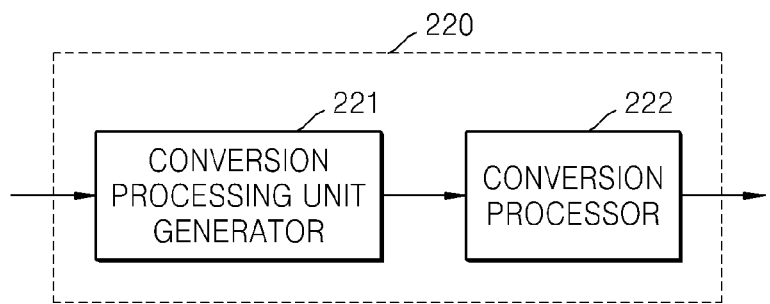
FIG. 3 is a block diagram illustrating in detail a bit-plane image converter of FIG. 2.

FIG. 3 is a block diagram illustrating in detail the bit-plane image converter 220 of FIG. 2. Referring to FIG. 3, the bit-plane image converter 220 includes a conversion processing unit generator 221 and a conversion processor 222.

The conversion processing unit generator 221 generates conversion processing units by binding "a" pixels, which are included in at least one lower bit-plane image having bits below a predetermined number from among n bit-plane images divided from an input image and are adjacent in one of a row direction and a column direction, wherein "a" is an integer greater than or equal to 2. When it is assumed that n has a value of $2^m$ (m is a positive integer), i.e., an exponentiation of 2, the lower bit-plane image denotes an image having below $2^{m-1}$ bits. For example, when pixel values of each pixel of the input image are expressed in $16(=2^4)$ bit strings, the bit-plane image separator 210 divides the input image into 16 bit-plane images, and the conversion processing unit generator 221 generates the conversion processing units by binding the pixels in $8(=2^3)$ lower bit-plane images from among the 16 bit-plane images by a pixels in one of a row direction and a column direction.

Figure 4A:
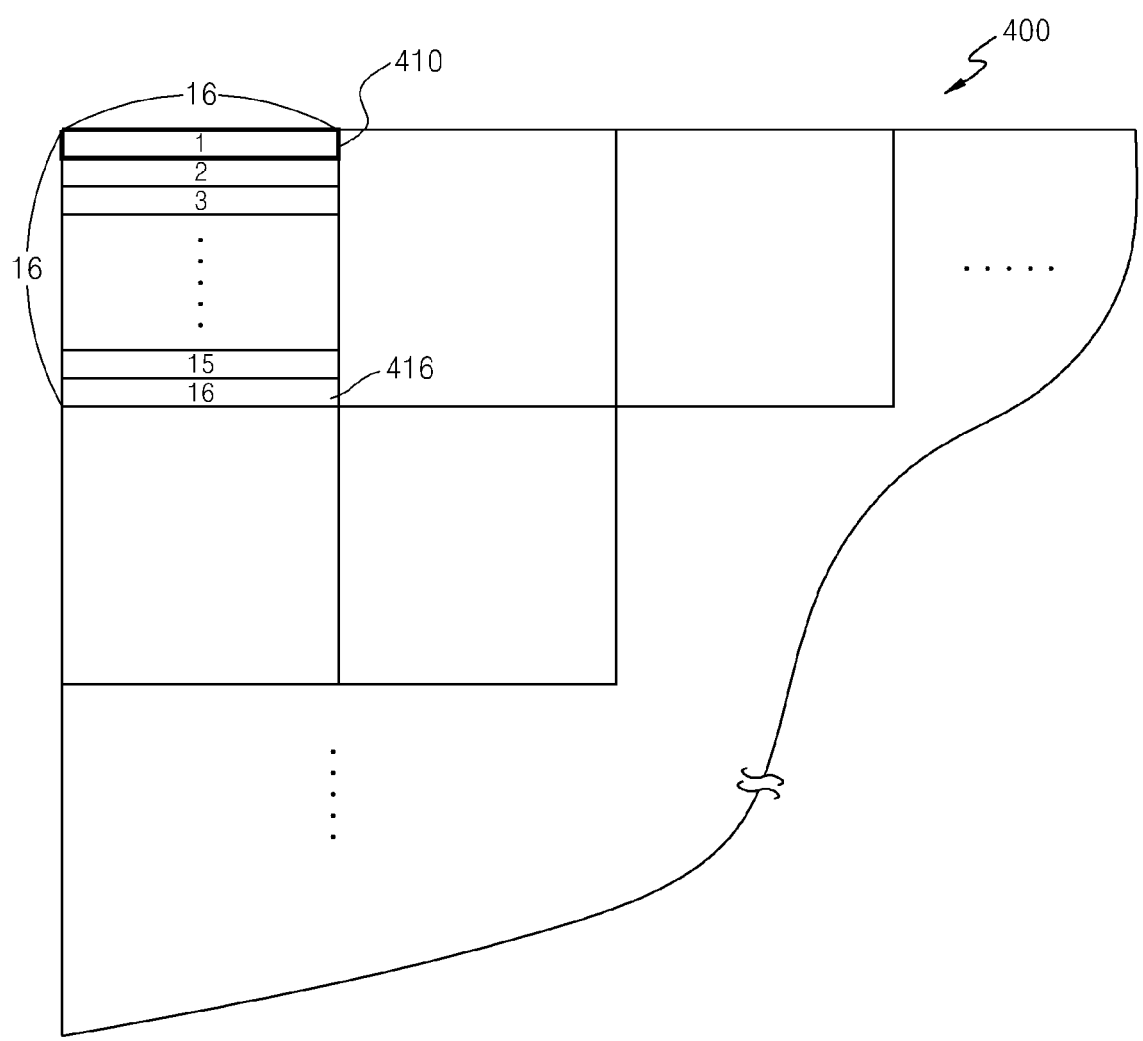
FIGS. 4A and 4B are diagrams for describing a process of generating conversion processing units from a lower bit-plane image performed by a conversion processing unit generator of FIG. 3 and a process of processing a conversion processing unit, according to an exemplary embodiment of the present invention.
Figure 4B:
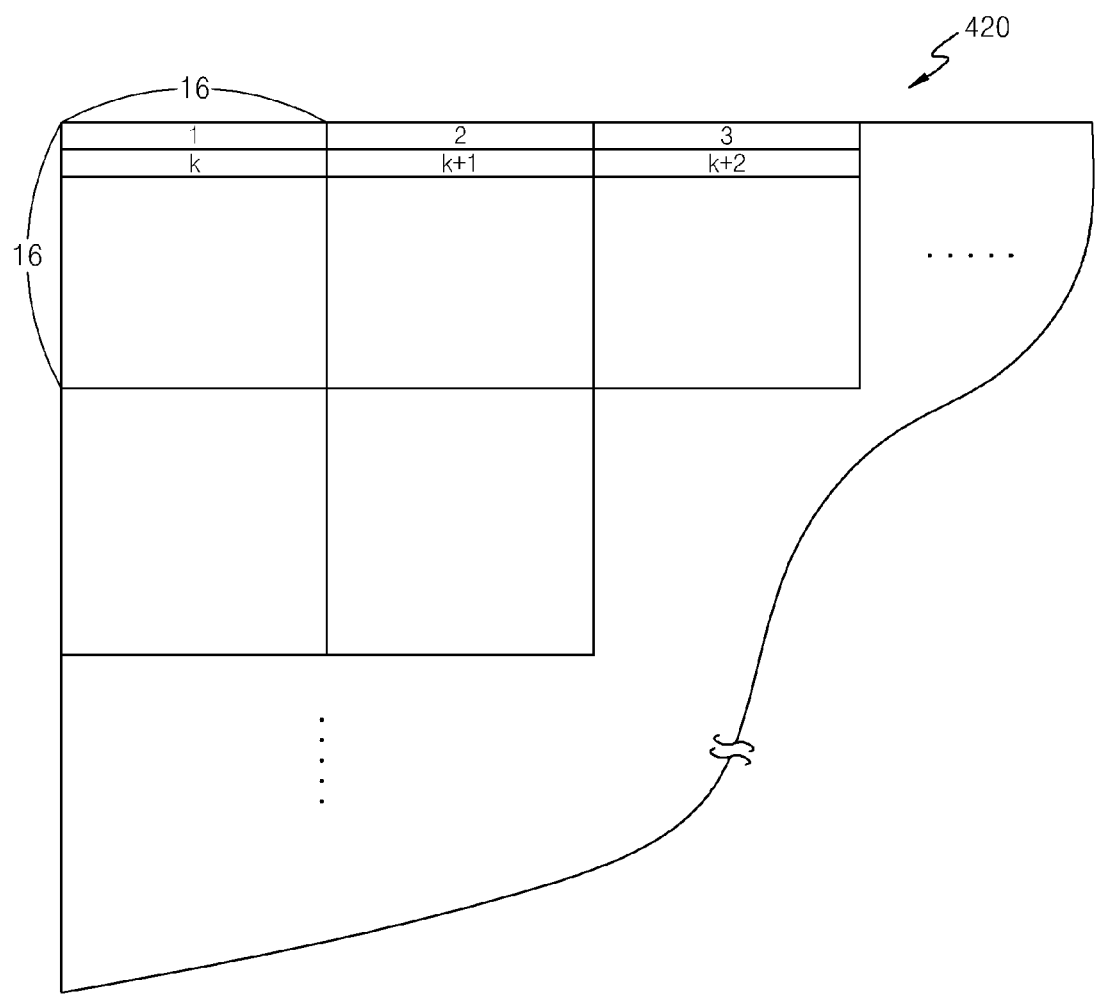

FIGS. 4A and 4B are diagrams for illustrating a process of generating conversion processing units from a lower bit-plane image performed in the conversion processing unit generator 221 of FIG. 3 and processing applied to a conversion processing unit, according to an exemplary embodiment of the present invention.

Referring to FIGS. 4A and 4B, the conversion processing unit generator 221 divides a lower bit-plane image into blocks having a predetermined size, for example, 16×16 macroblocks, and generates conversion processing units by dividing pixels in each macroblock into rows having a 1-pixel thickness. The conversion processing unit generator 221 may generate the conversion processing units by dividing the pixels in each macroblock into columns having a 1-pixel thickness instead of rows. As such, the 16 conversion processing units in one macroblock may be sequentially processed by the conversion processor 222 from a top conversion processing unit 410 to a bottom conversion processing unit 416 as illustrated in FIG. 4A. Alternatively, the conversion processing units included in one row of the entire lower bit-plane image may be sequentially processed by the conversion processor 222 from left to right as illustrated in FIG. 4B. The size of the block is not limited to 16×16, but may vary, such as 8×8, 32×32, and 64×64. Also, the size of the conversion processing unit is not limited to the exemplary embodiment of FIG. 4A, but may vary. For example, the size of one conversion processing unit may be 1×4, 4×1, 8×1, 1×8, 32×1, or 1×32. In order to convert pixel values of pixels in the conversion processing unit that will be described later, the conversion processing unit may include pixels having the size corresponding to an exponentiation of 2, such as $2^d \times 1$ or $1 \times 2^d$, wherein d is a positive integer.

Referring back to FIG. 3, the conversion processor 222 converts the pixel values of pixels in each conversion processing unit by accumulating pixel values from the initial pixel to a b-th pixel from among the "a" pixels in one conversion processing unit in a first direction selected from a positive direction and a negative direction, and accumulating pixel values from a (b+1)-th pixel to the last pixel in a second direction that is opposite to the first direction. Here, accumulating the pixel values in the positive direction means adding the pixel values of corresponding pixels in the conversion processing unit, and accumulating the pixel values in the negative direction means subtracting the pixel values of corresponding pixels.

In detail, when it is assumed that the first direction is the positive direction and the second direction is the negative direction, the conversion processor 222 converts the pixel values by accumulating the pixel values from the initial pixel to the b-th pixel in the positive direction, i.e., adding the pixel values, and accumulating the pixel values from the (b+1)-th pixel to the last pixel in the negative direction, i.e. subtracting the pixel values. Here, "a" has a value of $2^c$, and "b" has a value of $2^{c-1}$, wherein "c" is an integer of greater than or equal to 3. In other words, the number of pixels in one conversion processing unit is an exponentiation of 2, and a basis of the pixels accumulated in different directions may be the center of the conversion processing unit.

In detail, when it is assumed that the first direction is the positive direction and the second direction is the negative direction, the conversion processor 222 converts the pixel values of pixels in each conversion processing unit by adding the pixel values from the initial pixel to the b-th pixel, where "b" is a positive integer smaller than "a", from among the "a" pixels in each conversion processing unit, and setting the result of adding as new pixel values, and then subtracting the pixel values from the (b+1)-th pixel to the last pixel from the result of adding, and setting the result of subtracting as new pixel values. In other words, when $P_x$ denotes a pixel value of an x-th pixel ($1 \leq x \leq a$, x is an integer) from among the "a" pixels in one conversion processing unit, $P_x'$ denotes a pixel value obtained by converting $P_x$, wherein the first direction is the positive direction and the second direction is the negative direction, the conversion processor 222 converts the pixel values from the initial pixel to the b-th pixel according to Equation 1, and converts the pixel values from the (b+1)-th pixel to the last pixel according to Equation 2.

$$P'_x = \sum_{i=1}^{x} P_i \qquad (1)$$

(The first direction: +, from the initial pixel to the b-th pixel)

$$P'_x = \sum_{i=1}^{x} P_i - \sum_{j=b+1}^{x} P_j \qquad (2)$$

(The second direction: −, from the (b+1)-th pixel to the last pixel)

Similarly, when the first direction is the negative direction and the second direction is the positive direction, the conversion processor 222 converts the pixel values of the pixels in each conversion processing unit by subtracting the pixel values from the initial pixel to the b-th pixel, where "b" is a positive integer smaller than "a", from among the "a" pixels in one conversion processing unit and setting the result of subtracting as new pixel values, and then adding the pixel values from the (b+1)-th pixel to the last pixel and the result of subtracting and setting the result of adding as new pixel values. In other words, when $P_x$ denotes a pixel value of an x-th pixel ($1 \leq x \leq a$, x is an integer) from among the "a" pixels in one conversion processing unit, $P_x'$ denotes a pixel value obtained by converting $P_x$, wherein the first direction is the negative direction and the second direction is the positive direction, the conversion processor 222 converts the pixel values from the initial pixel to the b-th pixel according to Equation 3, and converts the pixel values from the (b+1)-th pixel to the last pixel according to Equation 4.

$$P'_x = P_1 - \sum_{i=2}^{x} P_i \qquad (3)$$

(The first direction: −, from the initial pixel to the b-th pixel. Here, P1'=P1)

$$P'_x = p_1 - \sum_{i=2}^{x} P_i + \sum_{j=b+1}^{x} P_j \quad (4)$$

(The second direction: +, from the (b+1)-th pixel to the last pixel)

Figure 5A:
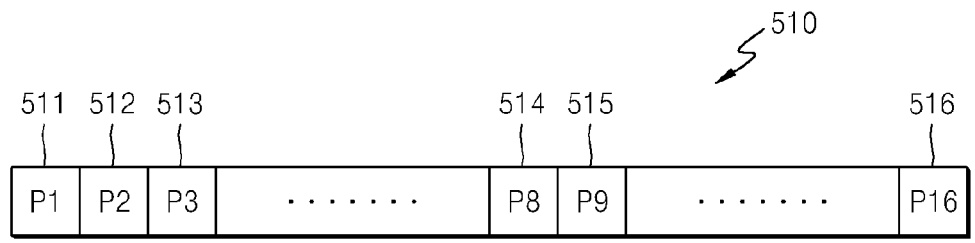
FIGS. 5A through 5C are diagrams for describing a conversion processing unit processed according to the present invention, and a conversion result thereof.
Figure 5B:
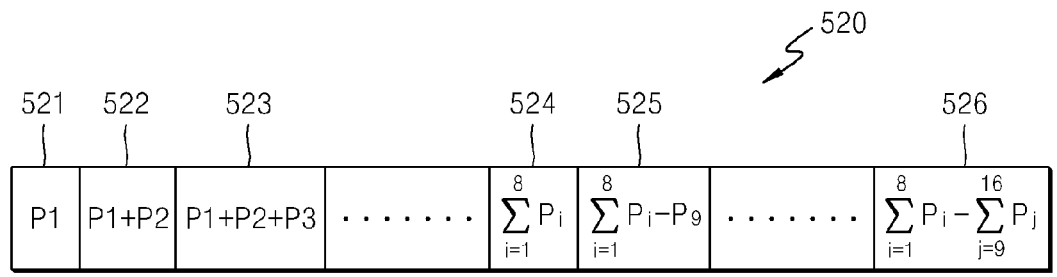
Figure 5C:
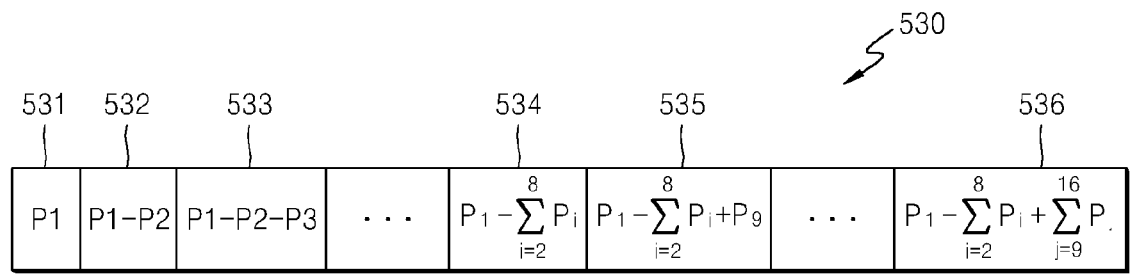
Figure 6A:
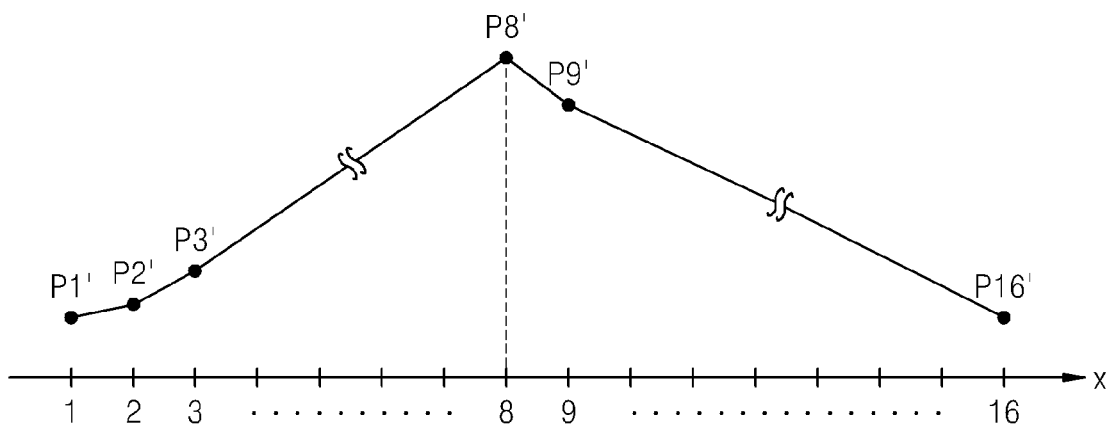
FIG. 6A is a graph showing change of pixel values of converted pixels illustrated in FIG. 5B.
Figure 6B:
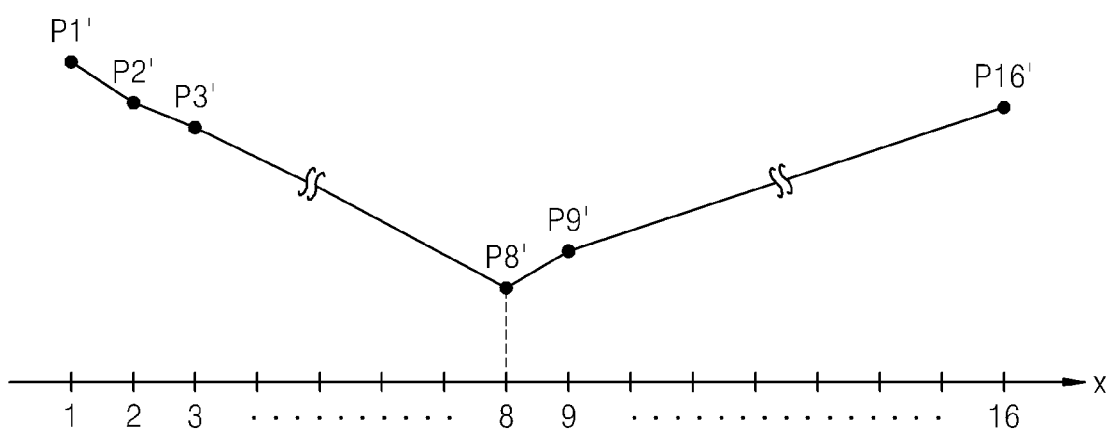
FIG. 6B is a graph showing change of pixel values of converted pixels illustrated in FIG. 5C.

FIGS. 5A through 5C are diagrams for describing a conversion processing unit processed according to embodiments of the present invention, and conversion results thereof FIG. 6A is a graph showing change of pixel values of converted pixels illustrated in FIG. 5B, and FIG. 6B is a graph illustrating change of pixel values of converted pixels illustrated in FIG. 5C. FIG. 5A illustrates one conversion processing unit generated from a lower bit-plane image, FIG. 5B illustrates a result of converting the conversion processing unit illustrated in FIG. 5A when a first direction is a positive direction and a second direction is a negative direction, and FIG. 5C illustrates a result of converting the conversion processing unit illustrated in FIG. 5A when the first direction is the negative direction and the second direction is the positive direction. Also, in FIGS. 5A through 5C, each conversion processing unit is formed of 16 pixels in a row direction, i.e., when "a" is 16 and "b" is 8.

Referring to FIGS. 5A and 5B, the conversion processor 222 converts pixel values from a first pixel 511 to an $8^{th}$ pixel 514 by adding each of the pixel values from the first pixel 511 to the $8^{th}$ pixel 514, and converts pixel values from a $9^{th}$ pixel 515 to a last $16^{th}$ pixel 516 by subtracting the corresponding pixel values from the result of adding. For example, referring to FIG. 5B, a second converted pixel 522 has a value of P1+P2, where pixel values from the first pixel 511 to a second pixel 512 are added, and a third converted pixel 523 has a value of P1+P2+P3, where pixel values from the first pixel 511 to a third pixel 513 are added. An $8^{th}$ converted pixel 524 has a value of $$\sum_{i=1}^{8} P_i,$$

where pixel values from the first pixel 511 to the $8^{th}$ pixel 514 are added.

The pixel values from the $9^{th}$ pixel 515 to the $16^{th}$ pixel 516 are converted by subtracting the corresponding pixel values from the value obtained by adding the pixel values from the first pixel 511 to the $8^{th}$ pixel 514. For example, a $9^{th}$ converted pixel 525 has a value of $$\sum_{i=1}^{8} P_i - P_9,$$

where the pixel value of the $9^{th}$ pixel 515 is subtracted from $$\sum_{i=1}^{8} P_i$$

obtained by adding the pixel values from the first pixel 511 to the $8^{th}$ pixel 514. A $16^{th}$ converted pixel 526 has a value of $$\sum_{i=1}^{8} P_i - \sum_{j=9}^{16} P_j,$$

where the pixel values from the $9^{th}$ pixel 515 to the $16^{th}$ pixel 516 are subtracted from the value obtained by adding the pixel values from the first pixel 511 to the $8^{th}$ pixel 514.

As such, when the pixel values from the first pixel 511 to the $8^{th}$ pixel 514 are added and the pixel values from the $9^{th}$ pixel 515 to the $16^{th}$ pixel 516 are subtracted from the result of adding, with the boundary of the $8^{th}$ pixel 514 and the $9^{th}$ pixel 515 as the center, the pixel values are converted in such a way that an $8^{th}$ converted pixel P8' has the maximum peak value as illustrated in FIG. 6A.

Similarly in another exemplary embodiment, referring to FIGS. 5A and 5C, the conversion processor 222 converts the pixel values from the first pixel 511 to the $8^{th}$ pixel 514 by subtracting each pixel value, and converts the pixel values from the $9^{th}$ pixel 515 to the $16^{th}$ pixel 516 by adding each pixel value. For example, referring to FIG. 5C, a second converted pixel 532 has a value of P1−P2, where the pixel value of the second pixel 512 is subtracted from the pixel value of the first pixel 511, and a third converted pixel 533 has a value of P1−P2−P3, where the pixel values of the second and third pixels 512 and 513 are subtracted from the pixel value of the first pixel 511. An $8^{th}$ converted pixel 534 has a value of $$P_1 - \sum_{i=2}^{8} P_i,$$

where the pixel values from the second through $8^{th}$ pixels 512 through 514 are subtracted from the pixel value of the first pixel 511.

The pixel values from the $9^{th}$ pixel 515 to the $16^{th}$ pixel 516 are converted by adding the corresponding pixel values and $$P_1 - \sum_{i=2}^{8} P_i.$$

For example, a $9^{th}$ converted pixel 535 has a value of $$P_1 - \sum_{i=2}^{8} P_i + P_9,$$

where the pixel value of the $9^{th}$ pixel 515 is added to $$P_1 - \sum_{i=2}^{8} P_i.$$

A 16th converted pixel 536 has a value of $$P_1 - \sum_{i=2}^{8} P_i + \sum_{j=9}^{16} P_j,$$

where pixel values from 9th pixel 515 to the 16th pixel 516 are added to $$P_1 - \sum_{i=2}^{8} P_i.$$

As such, when the pixel values from the first pixel 511 to the 8th pixel 514 are subtracted and the pixel values from the 9th pixel 515 to the 16th pixel 516 are added, with the boundary of the 8th pixel 514 and the 9th pixel 515 as the center, the pixel values are converted in such a way that an 8th converted pixel P8' has the minimum peak value as illustrated in FIG. 6B.

As described above, by converting the pixel values of the pixels in the conversion processing unit in such a way that the b-th pixel, a fixed location in the conversion processing unit, has a peak value, the conversion processing unit has a spatial regulation. Accordingly, the conversion processor 222 can convert a lower bit-plane image having low correlation and no regularity to an image having high correlation and high regularity. In the above embodiments, "a" is an exponentiation of 2 and the location of a converted pixel having the peak value is set to be the center of the conversion processing unit. However, the location of a converted pixel having the peak value may vary.

Figure 7A:
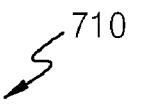
FIG. 7A is a diagram illustrating a 16×16 macro-block of a 4 bit low bit-plane image that is converted according to the present invention.
Figure 7B:
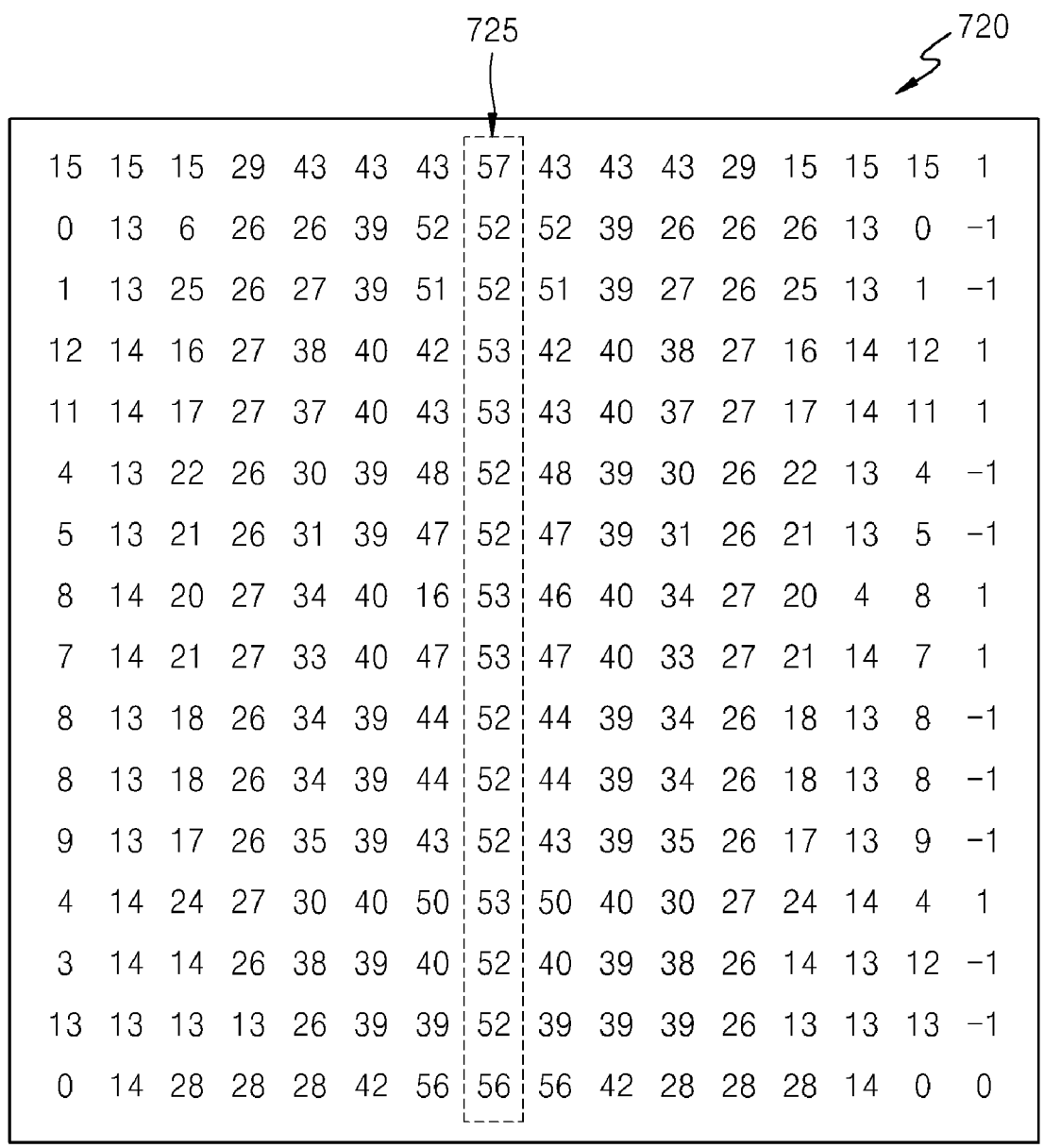
FIG. 7B is a diagram illustrating a result of converting pixels of the 16×16 macro-block of FIG. 7A.

FIG. 7A is a diagram illustrating a 16×16 macro-block 710 of a 4-bit low bit-plane image that is to be converted according to the present invention, and FIG. 7B is a diagram illustrating a result of converting pixels of the 16×16 macro-block 710 of FIG. 7A. In FIG. 7B, a row unit of the 16×16 macro-block 710 of FIG. 7A is a conversion processing unit, and a pixel value of a converted 8th pixel has the maximum value, i.e., a first direction is a positive direction, a second direction is a negative direction, "a" is 16, and "b" is 8.

Referring to FIG. 7B, the pixel values in the 16×16 macro-block 710 of the lower bit-plane image illustrated in FIG. 7A are converted by the conversion processor 222 in the row unit, and 8th pixels 725 have the maximum pixel values. A converted 16×16 macro-block 720 of FIG. 7B converted as above has a uniform regulation, and thus may have a high image processing efficiency during image processing, such as image compression.

Referring back to FIG. 2, after the pixels in the lower bit-plane image are all converted, the encoder 230 generates a bitstream by encoding the converted bit-plane images. Upper bit-plane images, for example, 8 upper bit-plane images formed of upper 8 bits when the input image is expressed in 16-bit strings, may be directly transmitted to the encoder 230 to be encoded without passing through the bit-plane image converter 220.

Figure 8:
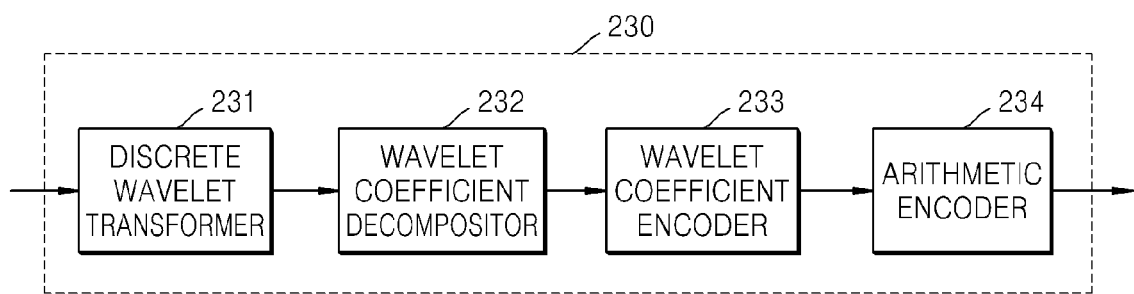
FIG. 8 is a block diagram illustrating in detail an encoder of FIG. 2, according to an exemplary embodiment of the present invention.

FIG. 8 is a block diagram illustrating in detail the encoder 230 of FIG. 2, according to an exemplary embodiment of the present invention.

Referring to FIG. 8, the encoder 230 comprises a discrete wavelet transformer 231, a wavelet coefficient decompositor 232, a wavelet coefficient encoder 233, and an arithmetic encoder 234.

Figure 9:
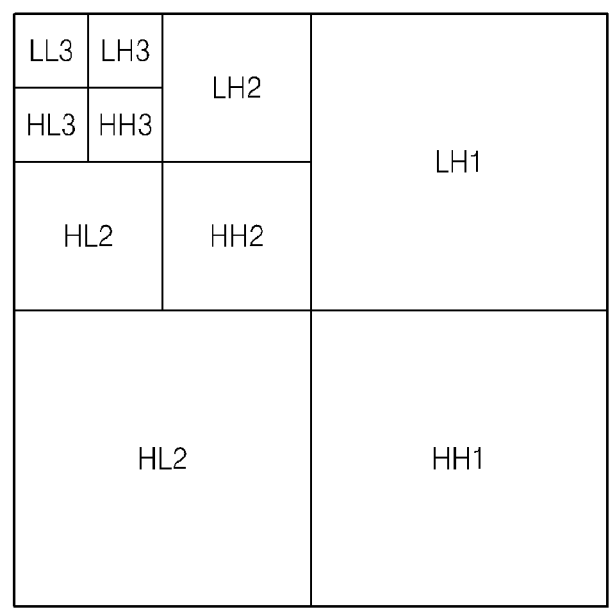
FIG. 9 is a diagram illustrating a wavelet decomposition structure.

The discrete wavelet transformer 231 performs discrete wavelet transform, which divides a two-dimensional (2-D) bit-plane image to 4 sub-band images LL1, LH1, HL1, and HH1 of FIG. 9, by applying an input bit-plane image to a low pass filter and a high pass filter.

FIG. 9 is a diagram illustrating a wavelet decomposition structure. Referring to FIGS. 8 and 9, the wavelet coefficient decompositor 232 generates smaller sub-band images LL2, LH2, HL2, and HH2 of level 2 by performing a wavelet decomposition process on the sub-band image LL1 of the discrete wavelet transformed bit-plane image, and generates sub-band images LL3, LH3, HL3, and HH3 of level 3 by again performing the wavelet decomposition process on the sub-band image LL2.

The wavelet coefficient encoder 233 encodes coefficients in each sub-band image via embedded zerotree wavelet coding (EZW) or set partitioning in hierarchical trees (SPIHT). The arithmetic encoder 234 generates a bitstream by performing context based arithmetic coding on symbols generated by encoding the coefficients in each sub-band image.

Meanwhile, the current exemplary embodiment is described based on the encoder 230 based on a discrete wavelet, but the encoder 230 is not limited thereto, and may be based on various codecs, such as JPEG, JPEG2000, JBIG, and JPEG-XR.

Figure 10:
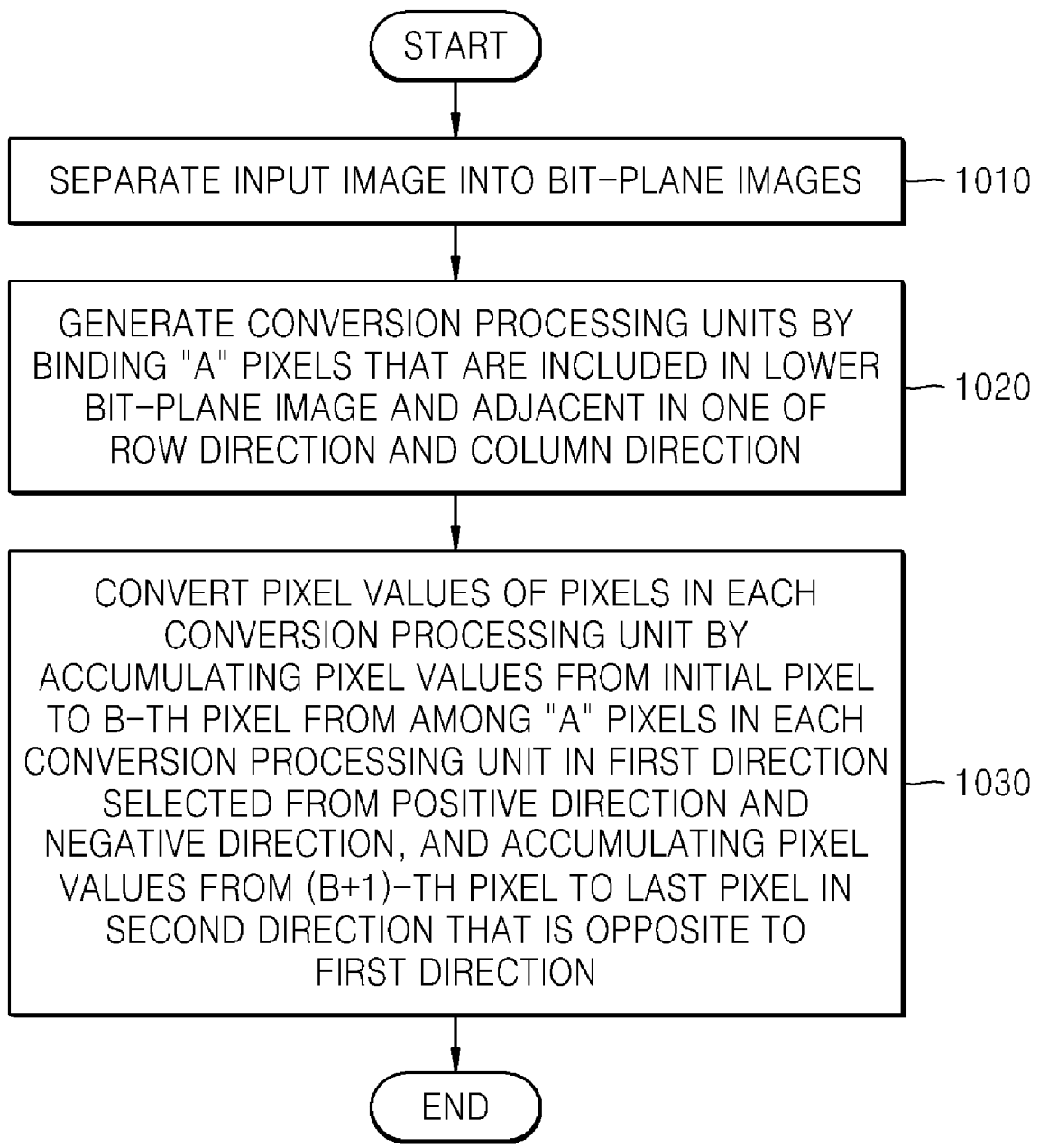
FIG. 10 is a flowchart of a method of converting a bit-plane image, according to an exemplary embodiment of the present invention.

FIG. 10 is a flowchart of a method of converting a bit-plane image, according to an exemplary embodiment of the present invention.

Referring to FIG. 10, the bit-plane image separator 210 divides an input image into n bit-plane images, wherein n is a positive integer, in operation 1010. As described above, when a pixel value of each pixel of the input image has a bit string including n bits, the bit-plane image separator 210 divides the input image into n bit-plane images each formed of the same bit of a bit string corresponding to each pixel value.

In operation 1020, the conversion processing unit generator 221 generates conversion processing units by binding "a" pixels ("a" is an integer of at least 2), which are included in at least one lower bit-plane image having bits below a predetermined number from among the n bit-plane images and are adjacent in one of a row direction and a column direction.

In operation 1030, the conversion processor 222 converts pixel values of pixels included in the conversion processing unit by accumulating pixel values from the initial pixel to a b-th pixel, where "b" is a positive integer smaller than "a", from among the "a" pixels in each conversion processing unit in a first direction selected from a positive direction and a negative direction, and accumulating pixel values from a (b+1)-th pixel to the last pixel in the conversion processing unit in a second direction that is opposite to the first direction. In other words, when the first direction is the positive direction and the second direction is the negative direction, the conversion processor 222 converts the pixel values by using Equations 1 and 2 so that a pixel value of a converted b-th pixel has the maximum value. When the first direction is the negative direction and the second direction is the positive direction, the conversion processor 222 converts the pixel values by using Equations 3 and 4 so that the pixel value of the converted b-th pixel has the minimum value.

Figure 11:
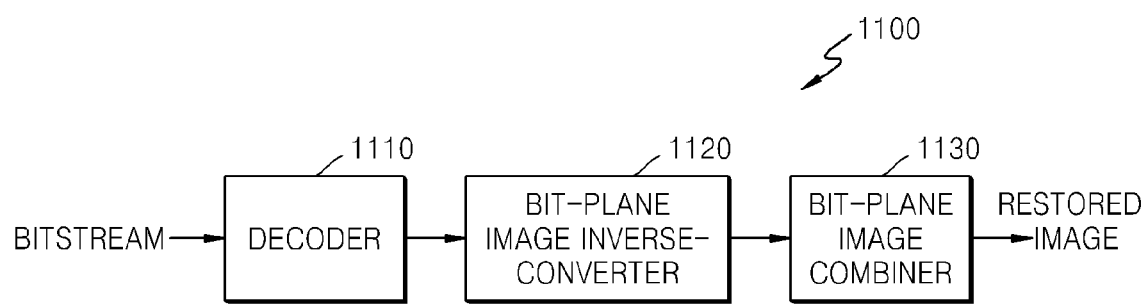
FIG. 11 is a block diagram illustrating an apparatus for decoding an image using an apparatus for inverse-converting a bit-plane image, according to an exemplary embodiment of the present invention.

FIG. 11 is a block diagram illustrating an apparatus 1100 for decoding an image using an apparatus for inverse-converting a bit-plane image, according to an exemplary embodiment of the present invention. The apparatus 1100 includes a decoder 1110, a bit-plane image inverse-converter 1120, and a bit-plane image combiner 1130.

The decoder 1110 generates wavelet transformed coefficients by entropy-decoding the wavelet transformed coefficients in a received bitstream, and generates a bit-plane image converted by performing inverse-wavelet transform on the decoded wavelet transformed coefficients, i.e. by repetitively performing up-sampling, filtering, and adding processes.

Figure 12:
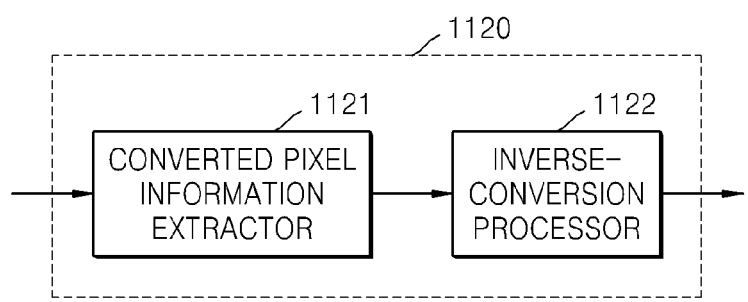
FIG. 12 is a block diagram illustrating in detail a bit-plane image inverse-converter of FIG. 11.

FIG. 12 is a block diagram illustrating in detail the bit-plane image inverse-converter 1120 of FIG. 11. Referring to FIG. 12, the bit-plane image inverse-converter 1120 includes a converted pixel information extractor 1121, and an inverse-conversion processor 1122.

The converted pixel information extractor 1121 extracts information about converted pixels that are included in inverse-conversion processing units each generated by binding converted "a" pixels, wherein "a" is an integer greater than or equal to 2, the converted "a" pixels included in a lower bit-plane image having bits below a predetermined number from among restored converted bit-plane images and adjacent in one of a column direction and a row direction, the converted pixels converted by accumulating pixel values from the initial pixel to a b-th pixel from among the converted a pixels in an inverse-conversion processing unit in a first direction selected from among a positive direction and a negative direction, and accumulating pixel values from a (b+1)-th pixel to the last pixel in the inverse-conversion processing unit in a second direction that is opposite to the first direction, wherein "b" is an integer less than "a".

The inverse-conversion processor 1122 restores pixel values of pixels each corresponding to the inverse-conversion processing unit by calculating a difference between an adjacent converted pixel value, for each of the a converted pixels in the inverse-conversion processing unit.

In detail, the inverse-conversion processor 1122 restores the pixel values from the second pixel to the b-th pixel according to Equation 5, and restores the pixel values from the (b+1)-th pixel to the last pixel according to Equation 6, wherein $P_x'$ denotes a pixel value of an x-th converted pixel from among the converted a pixels in the inverse-conversion processing unit, $P_x$ denotes a restored pixel value obtained by inverse-converting the converted pixel value $P_x'$, the first direction is a positive direction, and the second direction is a negative direction, wherein $1 \leq x \leq a$ and x is an integer.

$$P_x = P_x' - P_{x-1}', \text{ wherein } P1 = P1' \quad (5)$$

$$P_x = P_{x-1}' - P_x' \quad (6)$$

Similarly, the inverse-conversion processor 1122 restores the pixel values from the second pixel to the b-th pixel according to Equation 7, and restores the pixel values from the (b+1)-th pixel to the last pixel according to Equation 8, wherein $P_x'$ denotes a pixel value of an x-th converted pixel from among the a converted pixels in the inverse-conversion processing unit, $P_x$ denotes a restored pixel value obtained by inverse-converting the converted pixel value $P_x'$, the first direction is a negative direction, and the second direction is a positive direction, wherein $1 \leq x \leq a$ and x is an integer.

$$P_x = P_{x-1}' - P_x', \text{ wherein } P1 = P1' \quad (7)$$

$$P_x = P_x' - P_{x-1}' \quad (8)$$

Referring back to FIG. 11, the bit-plane image combiner 1130 restores an image by combining the upper bit-plane images restored in the decoder 1110 and lower bit-plane images inverse-converted in the bit-plane image inverse-converter 1120.

Figure 13:
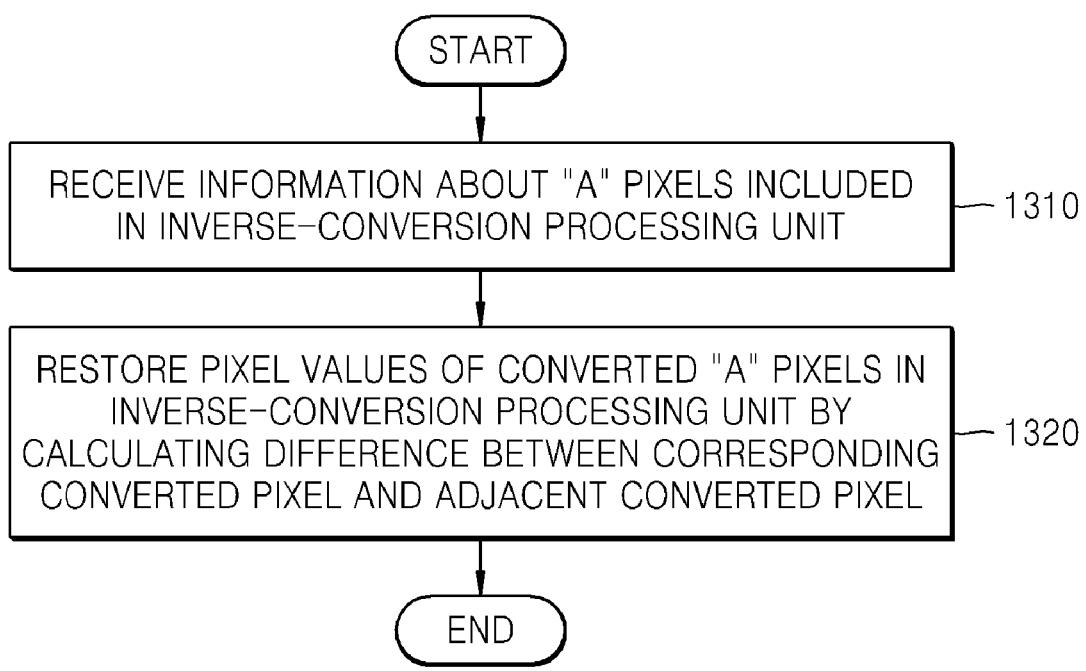
FIG. 13 is a flowchart of a method of inverse-converting a bit-plane image, according to an exemplary embodiment of the present invention.

FIG. 13 is a flowchart of a method of inverse-converting a bit-plane image, according to an exemplary embodiment of the present invention.

Referring to FIG. 13, information about converted pixels that are included in inverse-conversion processing units each generated by binding converted a pixels, wherein "a" is an integer greater than or equal to 2, is received. Here, the converted a pixels are included in a lower bit-plane image having bits below a predetermined number and are adjacent in one of a column direction and a row direction. Also, the converted pixels are converted by accumulating pixel values from the initial pixel to a b-th pixel from among the converted a pixels in the inverse-conversion processing unit in a first direction selected from among a positive direction and a negative direction, and accumulating pixel values from a (b+1)-th pixel to the last pixel in the inverse-conversion processing unit in a second direction that is opposite to the first direction, wherein "b" is an integer less than "a".

In operation 1320, pixel values of pixels each corresponding to the inverse-conversion processing unit are restored by calculating a difference between an adjacent converted pixel value, for each of the converted a pixels in the inverse-conversion processing unit. As described above, the converted pixels in the inverse-conversion processing unit are inverse-converted by calculating a difference between a corresponding converted pixel and a previous or following converted pixel according to Equations 5 through 8, considering an accumulation direction and a location of a converted pixel that is to be inverse-converted. When all the inverse-conversion processing units in one lower bit-plane image are inverse-converted, the lower bit-plane image is restored. Then, an image is restored by combining the restored low bit-plane images.

According exemplary embodiments of to the present invention, correlation between pixels in a lower bit-plane image can be increased. Also, by increasing the correlation between the pixels, efficiency of processing an image using lower bit-plane images can be increased. Moreover, processing performance of the entire image can be improved by increasing the correlation of the lower bit-plane images. Specifically, an image compressing efficiency can be improved by increasing the correlation between the pixels. The present invention can not only be applied to an apparatus for losslessly compressing and processing an image, such as a printer, but also to an apparatus for processing an image or a camera that processes random images. The present invention may also be applied to a lossless storage device of a high speed printer or a digital TV.

The invention can also be embodied as computer readable codes where are recorded on a computer readable recording medium and executable by a computer or computer system. The computer readable recording medium is any data storage device that can store data which can be thereafter read by a computer or a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of converting a bit-plane image, the method comprising:

separating an input image into n bit-plane images, wherein n is a positive integer;

generating conversion processing units by binding "a" pixels, which are included in at least one lower bit-plane image having bits less than a predetermined number from among the n bit-plane images and are adjacent in one of a row direction and a column direction, wherein "a" is an integer greater than or equal to 2; and converting pixel values of each pixel in each conversion processing unit by accumulating each pixel value from an initial pixel to a b-th pixel from among the "a" pixels in each conversion processing unit in a first direction selected from among a positive direction and a negative direction, and accumulating each pixel value from a (b+1)-th pixel to a last pixel in a second direction that is opposite to the first direction, in each conversion processing unit, wherein "b" is an integer less than "a".

2. The method of claim 1, wherein in the converting the pixel values, the pixel values from the initial pixel to the b-th pixel are converted according to an equation $$P'_x = \sum_{i=1}^{x} P_i,$$

and the pixel values from the (b+1)-th pixel to the last pixel are converted according to an equation $$P'_x = \sum_{i=1}^{b} P_i - \sum_{j=b+1}^{x} P_j,$$

where $P_x$ denotes a pixel value of an x-th pixel from among the "a" pixels in each conversion processing unit, $P_x'$ denotes a converted pixel value of $P_x$, the first direction is a positive direction, and the second direction is a negative direction, $1 \leq x \leq a$ and x is an integer.

3. The method of claim 1, wherein in the converting the pixel values, a converted pixel value $P_1'$ of the initial pixel is $P_1$, the pixel values from the second pixel to the b-th pixel are converted according to an equation $$P'_x = P_1 - \sum_{i=2}^{x} P_i,$$

and the pixel values from the (b+1)-th pixel to the last pixel are converted according to an equation $$P'_x = P_1 - \sum_{i=2}^{b} P_i + \sum_{j=b+1}^{x} P_j,$$

where $P_x$ denotes a pixel value of an x-th pixel from among the "a" pixels in each conversion processing unit, $P_x'$ denotes a converted pixel value of $P_x$, the first direction is a negative direction, the second direction is a positive direction, $1 \leq x \leq a$ and x is an integer.

4. The method of claim 1, wherein "a" has a value of $2^c$, and "b" has a value of $2^{c-1}$, and "c" is an integer greater than or equal to least 3.

5. The method of claim 1, wherein n has a value of $2^m$, the lower bit-plane image is one from among images having less than $2^{m-1}$ bits, and m is a positive integer.

6. An apparatus for converting a bit-plane image, the apparatus comprising:

a bit-plane image separator which separates an input image into n bit-plane images, wherein n is a positive integer;

a conversion processing unit generator which generates conversion processing units by binding "a" pixels, which are included in at least one lower bit-plane image having bits less than a predetermined number from among the n bit-plane images and are adjacent in one of a row direction and a column direction, wherein "a" is an integer greater than or equal to 2; and a conversion processor which converts pixel values of each pixel in each conversion processing unit by accumulating each pixel value from an initial pixel to a b-th pixel from among the "a" pixels in each conversion processing unit in a first direction selected from among a positive direction and a negative direction, and accumulating each pixel value from a (b+1)-th pixel to a last pixel in a second direction that is opposite to the first direction, according to each conversion processing unit, wherein "b" is an integer less than "a".

7. The apparatus of claim 6, wherein the conversion processor converts the pixel values from the initial pixel to the b-th pixel according to an equation $$P'_x = \sum_{i=1}^{x} P_i,$$

and converts the pixel values from the (b+1)-th pixel to the last pixel are converted according to an equation $$P'_x = \sum_{i=1}^{b} P_i - \sum_{j=b+1}^{x} P_j,$$

where $P_x$ denotes a pixel value of an x-th pixel from among the "a" pixels in each conversion processing unit, $P_x'$ denotes a converted pixel value of $P_x$, the first direction is a positive direction, the second direction is a negative direction, $1 \leq x \leq a$ and x is an integer.

8. The apparatus of claim 6, wherein a converted pixel value $P_1'$ of the initial pixel is $P_1$, and the conversion processor converts the pixel values from the second pixel to the b-th pixel according to an equation $$P'_x = P_1 - \sum_{i=2}^{x} P_i,$$

and converts the pixel values from the (b+1)-th pixel to the last pixel according to an equation $$P'_x = P_1 - \sum_{i=2}^{b} P_i + \sum_{j=b+1}^{x} P_j,$$

where $P_x$ denotes a pixel value of an x-th pixel from among the "a" pixels in each conversion processing unit, $P_x'$ denotes a converted pixel value of $P_x$, the first direction is a negative direction, the second direction is a positive direction, $1 \leq x \leq a$ and x is an integer.

9. The apparatus of claim 6, wherein "a" has a value of $2^c$, "b" has a value of $2^{c-1}$, and "c" is an integer greater than or equal to 3.

10. The apparatus of claim 6, wherein n has a value of $2^m$ the lower bit-plane image is one from among images having less than $2^{m-1}$ bits, and m is a positive integer.

11. A method of inverse-converting a bit-plane image, the method comprising:

receiving information about converted pixels that are included in inverse-conversion processing units each generated by binding converted "a" pixels, wherein "a" is an integer greater than or equal to 2, the converted "a" pixels are included in a lower bit-plane image having bits less than a predetermined number and adjacent in one of a column direction and a row direction, the converted pixels are converted by accumulating pixel values from an initial pixel to a b-th pixel from among the converted "a" pixels in an inverse-conversion processing unit in a first direction selected from among a positive direction and a negative direction, and accumulating pixel values from a (b+1)-th pixel to a last pixel in the inverse-conversion processing unit in a second direction that is opposite to the first direction, wherein "b" is an integer less than "a"; and restoring pixel values of pixels each corresponding to the inverse-conversion processing unit by calculating a difference between an adjacent converted pixel value, for each of the converted "a" pixels in the inverse-conversion processing unit.

12. The method of claim 11, wherein in the restoring of the pixel values, a pixel value $P_1$ of the initial pixel from among the "a" converted pixels in the inverse-conversion processing unit is $P_1'$, the pixel values from the second pixel to the b-th pixel are restored according to an equation $P_x=P_x'-P_{x-1}'$, and the pixel values from (b+1)-th pixel to the last pixel are restored according to an equation $P_x=P_{x-1}'-P_x'$, where $P_x'$ denotes a pixel value of an x-th converted pixel from among the a converted pixels in the inverse-conversion processing unit, $P_x$ denotes a restored pixel value obtained by inverse-converting the converted pixel value $P_x'$, the first direction is a positive direction, the second direction is a negative direction, $1 \leq x \leq a$ and x is an integer.

13. The method of claim 11, wherein in the restoring the pixel values, a pixel value $P_1$ of the initial pixel from among the converted "a" pixels in the inverse-conversion processing unit is $P_1'$, the pixel values from the second pixel to the b-th pixel are restored according to an equation $P_x=P_{x-1}'-P_x'$, and the pixel values from (b+1)-th pixel to the last pixel are restored according to an equation $P_x=P_x'-P_{x-1}'$, where $P_x'$ denotes a pixel value of an x-th converted pixel from among the converted "a" pixels in the inverse-conversion processing unit, $P_x$ denotes a restored pixel value obtained by inverse-converting the converted pixel value $P_x'$, the first direction is a negative direction, the second direction is a positive direction, $1 \leq x \leq a$ and x is an integer.

14. An apparatus for inverse-converting a bit-plane image, the apparatus comprising:

a converted pixel information extractor which extracts information about converted pixels that are included in inverse-conversion processing units each generated by binding converted "a" pixels, wherein "a" is an integer greater than or equal to 2, the converted "a" pixels are included in a lower bit-plane image having bits less than a predetermined number and adjacent in one of a column direction and a row direction, the converted pixels are converted by accumulating pixel values from the initial pixel to a b-th pixel from among the converted "a" pixels in an inverse-conversion processing unit in a first direction selected from among a positive direction and a negative direction, and accumulating pixel values from a (b+1)-th pixel to the last pixel in the inverse-conversion processing unit in a second direction that is opposite to the first direction, wherein "b" is an integer less than "a"; and an inverse-conversion processor which restores pixel values of pixels each corresponding to the inverse-conversion processing unit by calculating a difference between an adjacent converted pixel value for each of the converted "a" pixels in the inverse-conversion processing unit.

15. The apparatus of claim 14, wherein a pixel value $P_1$ of the initial pixel from among the "a" converted pixels in the inverse-conversion processing unit is $P_1'$, and the inverse-conversion processor restores the pixel values from the second pixel to the b-th pixel according to an equation $P_x=P_x'-P_{x-1}'$, and restores the pixel values from the (b+1)-th pixel to the last pixel according to an equation $P_x=P_{x-1}'-P_x'$, where $P_x'$ denotes a pixel value of an x-th converted pixel from among the converted "a" pixels in the inverse-conversion processing unit, $P_x$ denotes a restored pixel value obtained by inverse-converting the converted pixel value $P_x'$, the first direction is a positive direction, the second direction is a negative direction, $1 \leq x \leq a$ and x is an integer.

16. The apparatus of claim 14, wherein a pixel value $P_1$ of the initial pixel from among the converted a pixels in the inverse-conversion processing unit is $P_1'$, and the inverse-conversion processor restores the pixel values from the second pixel to the b-th pixel according to an equation $P_x=P_{x-1}'-P_x'$, and restores the pixel values from (b+1)-th pixel to the last pixel according to an equation $P_x=P_x'-P_{x-1}'$, where $P_x'$ denotes a pixel value of an x-th converted pixel from among the converted "a" pixels in the inverse-conversion processing unit, $P_x$ denotes a restored pixel value obtained by inverse-converting the converted pixel value $P_x'$, the first direction is a negative direction, the second direction is a positive direction, $1 \leq x \leq a$ and x is an integer.

17. The apparatus of claim 6, further comprising:

an encoder, which generates a bitstream by encoding the converted bit-plane images, the encoder comprising:

a discrete wavelet transformer which performs discrete wavelet transform on each bit-plane image transforming each bit-plane image into a plurality of first sub-band images by applying an input bit-pane image to a low pass filter and a high pass filter;

a wavelet coefficient decompositor which generates a plurality of second sub-band images by performing a wavelet decomposition process on at least one of the first sub-band images;

a wavelet coefficient encoder which encodes coefficients in each first and second sub-band image; and an arithmetic encoder which generates a bitstream by performing context based arithmetic coding on symbols generated by encoding the coefficients in each first and second sub-band image.

18. The apparatus of claim 17, wherein the wavelet coefficient encoder encodes each first and second sub-band image using embedded zerotree wavelet coding.

19. The apparatus of claim 17, wherein the wavelet coefficient encoder encodes each first and second sub-band image using set partitioning in hierarchical trees.

* * * * *